(12) United States Patent
Taguchi et al.

(10) Patent No.: US 7,070,861 B2
(45) Date of Patent: Jul. 4, 2006

(54) FLAME RETARDANT EPOXY RESIN COMPOSITION, AND PREPREG AND FIBER-REINFORCED COMPOSITE MATERIALS MADE BY USING THE COMPOSITION

(75) Inventors: Masato Taguchi, Aichi (JP); Yasushi Suzumura, Aichi (JP); Tadayoshi Saitou, Aichi (JP); Akihiro Itou, Aichi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 232 days.

(21) Appl. No.: 10/450,440

(22) PCT Filed: Dec. 18, 2001

(86) PCT No.: PCT/JP01/11109
§ 371 (c)(1),
(2), (4) Date: Jun. 18, 2003

(87) PCT Pub. No.: WO02/50153

PCT Pub. Date: Jun. 27, 2002

(65) Prior Publication Data

US 2004/0034127 A1    Feb. 19, 2004

(30) Foreign Application Priority Data

Dec. 18, 2000  (JP)  ............... 2000-383891

(51) Int. Cl.
- *B32B 27/38* (2006.01)
- *C08L 63/02* (2006.01)
- *C08L 63/04* (2006.01)

(52) U.S. Cl. ............... 428/413; 428/396; 523/427; 523/451

(58) Field of Classification Search ............. 523/427, 523/451; 428/396, 418
See application file for complete search history.

(56) References Cited

U.S. PATENT DOCUMENTS 5,641,997 A * 6/1997 Ohta et al. ............... 257/788

(Continued)

FOREIGN PATENT DOCUMENTS

| JP | 2000-154301 | 6/2000 |
| JP | 2000-159980 | 6/2000 |
| JP | 2000-169672 | 6/2000 |

OTHER PUBLICATIONS

English Translation of JP 2000-169672 obtained from JPO web-site, Imaizumi et al., Jun. 2000.*

(Continued)

*Primary Examiner*—Jeffrey B. Robertson
(74) *Attorney, Agent, or Firm*—Oblon, Spivak, McClelland, Maier & Neustadt, P.C.

(57) ABSTRACT

A flame retardant epoxy resin composition containing (A) a phenolic novolak type epoxy resin including a phenolic novolak type epoxy resin of the following formula (1) and/or formula (2) in a total of at least 50 wt %:

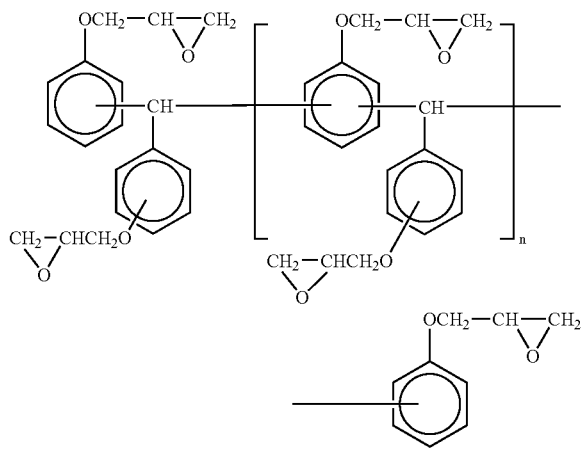

(wherein, n is 0 or a positive integer)

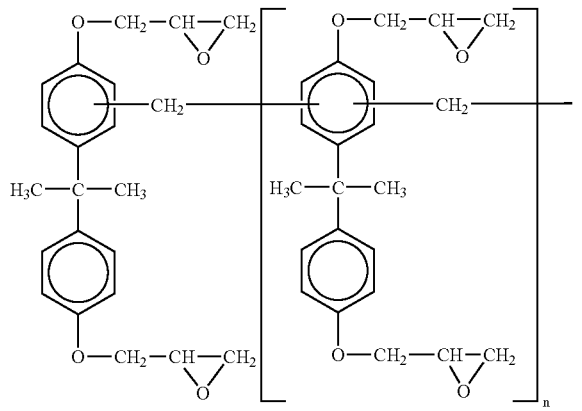

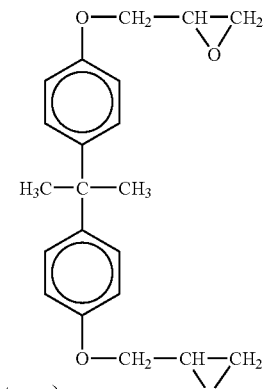

(wherein, n is 0 or a positive integer)
(B) a bisphenol type epoxy resin not containing a halogen, (C) an inorganic filler, and (D) an organic flame retardant. A prepreg and a fiber-reinforced composite using this epoxy resin composition.

15 Claims, No Drawings

U.S. PATENT DOCUMENTS

| | | |
|---|---|---|
| 5,759,690 A | 6/1998 | von Gentzkow et al. |
| 5,760,146 A | 6/1998 | von Gentzkow et al. |
| 5,817,736 A | 10/1998 | von Gentzkow et al. |
| 6,342,309 B1 * | 1/2002 | Shiobara et al. ............ 428/620 |
| 6,361,879 B1 * | 3/2002 | Tsutsumi et al. ........... 428/620 |
| 6,645,630 B1 * | 11/2003 | Nakamura et al. .......... 428/413 |
| 6,838,176 B1 * | 1/2005 | Goto et al. ................. 428/413 |

OTHER PUBLICATIONS

Patent Abstracts of Japan, JP 03-124758, May 28, 1991.

* cited by examiner

FLAME RETARDANT EPOXY RESIN COMPOSITION, AND PREPREG AND FIBER-REINFORCED COMPOSITE MATERIALS MADE BY USING THE COMPOSITION

TECHNICAL FIELD

The present invention relates to an epoxy resin composition provided with both superior mechanical properties and flame retardance, a prepreg comprised of this impregnated in reinforcing fiber, and a fiber-reinforced composite molded from the same.

BACKGROUND ART

Fiber-reinforced composites comprised of carbon fiber or other reinforcing fiber and an epoxy resin or other matrix resin are light in weight and superior in corrosion resistance, durability, and other mechanical properties and for example are used in a broad range of fields from for example fishing rods, golf club shafts, and other general use applications to general industrial applications and further to aircraft and other applications etc.

As the method for molding such fiber-reinforced composites, in particular fiber-reinforced composites using carbon fiber as reinforcing fiber, the method of curing and molding an intermediate material comprised of so-called "prepregs" consisting of reinforcing fiber impregnated with a matrix resin is most broadly used.

As the matrix resin when making prepregs, an epoxy resin features various superior properties and therefore is used for fiber-reinforced composites for a broad range of applications from sports applications to industrial applications. As an epoxy resin, conventionally a bisphenol A type epoxy resin has mainly been used, but demand for flame retardant epoxy resins has been rising in recent years for interior applications of aircraft.

As methods for making epoxy resins flame retardant, there are known the 1) method of adding a halogenated epoxy resin (for example, a bromium-modified epoxy resin) to the matrix resin or the method of blending a halogenated epoxy resin (for example, a bromium-modified epoxy resin) and antimony trioxide into the matrix resin (Japanese Unexamined Patent Publication (Kokai) No. 55-92757 and Japanese Unexamined Patent Publication (Kokai) No. p9-278914), 2) the method of adding a flame retardant comprised of a phosphorus-based compound to the matrix resin (Japanese Examined Patent Publication (Kokoku) No. 59-49942), 3) the method of blending aluminum hydroxide or another inorganic filler into the matrix resin (Japanese Unexamined Patent Publication (Kokai) No. 1-197554, and 4) the method of using together an inorganic filler and phosphorus-based flame retardant and blending them into the matrix resin (Japanese Unexamined Patent Publication (Kokai) No. 2000-154301, Japanese Unexamined Patent Publication (Kokai) No. 2000-159980), etc. The methods of imparting flame retardance according to these means 1) to 4) block off the air to stop the supply of oxygen and suppress burning by the halogen gas or steam etc. caused at the time of combustion.

However, fiber-reinforced composites made flame retardant by the means of 1) to 2) have the defects of low heat resistance of the fiber-reinforced composites themselves, brittle mechanical properties, etc. With composites made by the means of 3), the viscosity of the impregnated resin becomes high if trying to impart flame retardance by just an inorganic filler and therefore the impregnatability of the impregnated resin at the time of making prepregs becomes poor. Further, with composites made by the means of 4), the amount of inorganic filler added is large and the viscosity of the impregnated resin becomes high, so not only does the impregnatability of the impregnated resin become poor at the time of making prepregs, but also the tackiness of the prepreg surface ends up being lost and therefore prepregs will not stick to each other or will not stick to the molds when molding prepregs by the hand layup method or other problems of poor moldability will arise. Further, as the ratio of composition of the inorganic component increases, there is also the problem that the mechanical properties or heat resistance of the fiber-reinforced composites obtained will greatly fall.

Further, Japanese Unexamined Patent Publication (Kokai) No. 11-60689 mentions the method of using an epoxy resin obtained by reacting a bisphenol A type epoxy resin, a phenolic novolak type epoxy resin, and flame retardant having functional groups able to react with an epoxy resin, while Japanese National Disclosure Publication (Kohyo) No. 8-507811 shows the method of using a phosphorus-modified epoxy resin comprised of a reaction product of a polyepoxy compound and anhydrous phosphinic acid etc. Composites obtained from these means, however, require a separate process of reacting the epoxy resins with a flame retardant, anhydrous phosphinic acid, etc., so are inconvenient in mass production and therefore are more expensive in price.

DISCLOSURE OF THE INVENTION

Therefore, the problem to be solved by the present invention is to provide a flame retardant epoxy resin composition giving a fiber-reinforced composite provided with superior flame retardance, of a non-halogen type, free from factors inconvenient for mass production, and with a good balance between mechanical properties and heat resistance, and a prepreg and fiber-reinforced composite using the same.

The above problem can be solved by a flame retardant epoxy resin composition according to the following configuration and a prepreg and fiber-reinforced composite using the same.

That is, the present invention provides a flame retardant epoxy resin composition containing the following components (A), (B), (C), and (D):

(A) a phenolic novolak type epoxy resin including a phenolic novolak type epoxy resin of the following formula (1) and/or formula (2) in a total of at least 50 wt %:

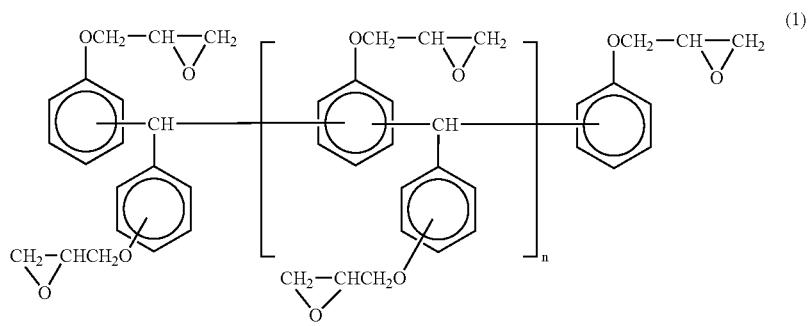

(wherein, n is 0 or a positive integer)

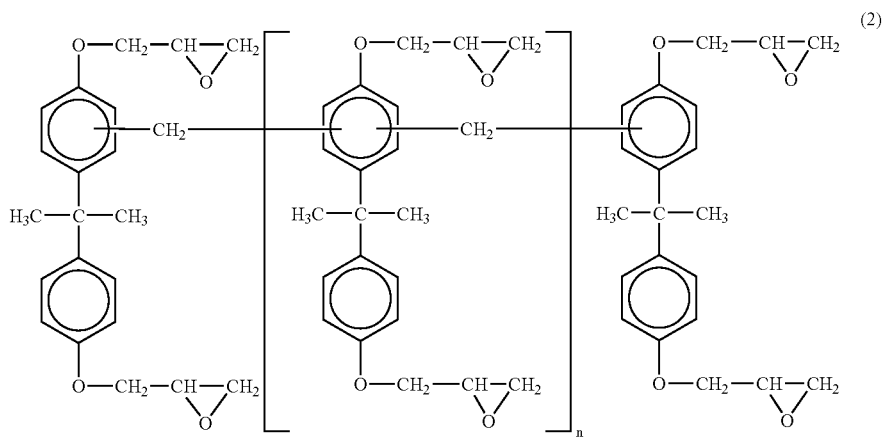

(wherein, n is 0 or a positive integer)

(B) a bisphenol type epoxy resin not containing a halogen,
(C) an inorganic filler, and
(D) an organic flame retardant The present invention also provides a prepreg containing reinforcing fiber, the above flame retardant epoxy resin composition impregnated in the reinforcing fiber, and a curing agent.

The present invention still further provides a fiber-reinforced composite obtained by molding a molding material containing the above prepreg.

BEST MODE FOR CARRYING OUT THE INVENTION

Component (A)

In the flame retardant epoxy resin composition of the present invention, by blending into the phenolic novolak type epoxy resin serving as the component (A) a phenolic novolak type epoxy resin of the above formula (1) or formula (2) in an amount of at least 50 wt % with respect to the total weight of the phenolic novolak type epoxy resin, it is possible to suppress the decline in the heat resistance or mechanical properties due to the blending of the inorganic filler serving as the component (C) or the organic flame retardant serving as the component (D).

Note that the phenolic novolak type epoxy resin of the above formula (1) or formula (2) contained in an amount of at least 50 wt % in the phenolic novolak type epoxy resin serving as the component (A) may also be a mixture of the phenolic novolak type epoxy resins of the formula (1) and formula (2). In this case, it is sufficient if the total amount of the phenolic novolak type epoxy resins of formula (1) and formula (2) be at least 50 wt % of the total weight of the phenolic novolak type epoxy resin serving as the component (A).

If blending an inorganic filler or organic flame retardant into a general use phenolic novolak type epoxy resin or bisphenol A type epoxy resin, a remarkable drop in heat resistance or drop in mechanical properties occurs, but by blending in the phenolic novolak type epoxy resin of the above formula (1) or formula (2), the drop in the heat resistance or mechanical properties arising due to the blending of the component (C) or component (D) is suppressed as explained above.

To adjust the viscosity of the epoxy resin composition to a suitable level of viscosity required for a matrix resin when making a prepreg, it is preferable to use as the component (A) one having an epoxy equivalent of not more than 300.

Component (B)

As the component (B), it is desirable to use a bisphenol A type epoxy resin, bisphenol F type epoxy resin, bisphenol S type epoxy resin, etc. The resin may be a single type of resin or a mixture of different types of bisphenol type epoxy resins.

To adjust the viscosity of the epoxy resin composition to a suitable level of viscosity required for a matrix resin when making a prepreg, it is preferable to use as the component (B) a liquid epoxy resin of an epoxy equivalent of not more than 200.

Ratio of Composition of Component (A) and Component (B)

In the epoxy resin components in the epoxy resin composition of the present invention, that is, the component (A) and component (B), if the bisphenol type epoxy resin not containing a halogen serving as the component (B) becomes less than 5 parts by weight with respect to 100 parts by weight of the phenolic novolak type epoxy resin serving as the component (A), the heat resistance will become more advantageous, but the handling characteristics of the prepreg will sometimes decline, while if over 20 parts by weight, the handling characteristics of the prepreg will become more advantageous, but the heat resistance will sometimes decine. Therefore, the ratio of composition of the component (A) and the component (B) is preferably 100:5 to 100:20.

Component (C)

As the inorganic filler serving as the component (C), for example, it is possible to mention at least one type or mixtures of two or more types of fillers selected from aluminum hydroxide, calcium hydroxide, magnesium hydroxide, or other metal hydroxides and metal oxide hydrates containing montmorillonite, higilite, talc, mica, and other clay minerals. Among these, aluminum hydroxide with its high endothermic effect is preferable. Further, as an inorganic filler useful as the component (C), to improve the impregnatability of the epoxy resin composition when obtaining a prepreg, one having an average particle size of not more than 5 μm is preferable and one having an average particle size of not more than 1 μm is more preferable.

If the amount blended of the inorganic filler serving as the component (C) in the epoxy resin composition of the present invention becomes less than 5 parts by weight with respect to 100 parts by weight of the total of the component (A), component (B), component (C), and component (D), the handling characteristics of the prepreg, the heat resistance, and the mechanical properties become more advantageous, but the flame retardance sometimes becomes insufficient. Further, if over 30 parts by weight, the flame retardance becomes more advantageous, but the handling characteristics of the prepreg, heat resistance, and mechanical properties sometime decline. Therefore, from the viewpoint of the balance among the prepreg flame retardance, moldability, handling characteristics, heat resistance, and mechanical properties, it is preferable to make the amount of the inorganic filler serving as the component (C) 5 to 30 parts by weight with respect to 100 parts by weight of the total of the component (A), component (B), component (C), and component (D).

Component (D)

As the organic flame retardant of the component (D), a heterocyclic compound, nitrogen-containing compound, phosphorus-containing compound, etc. may be mentioned, but a phosphorus-containing compound liquid at room temperature is particularly preferable. Further, a phosphorus-based flame retardant of an aromatic non-halogen type liquid at room temperature such as shown in the following formula (3), formula (4), and formula (5) is suitable. One of a type not having functional groups able to react with an epoxy resin is preferable.

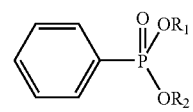

(3)

(where, $R_1$ and $R_2$ indicate alkyl groups and $R_1$ and $R_2$ may be the same or different)

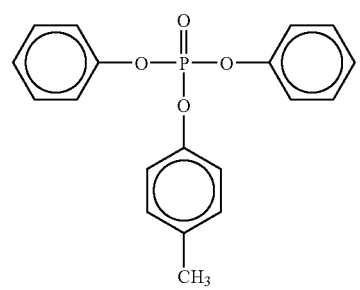

(4)

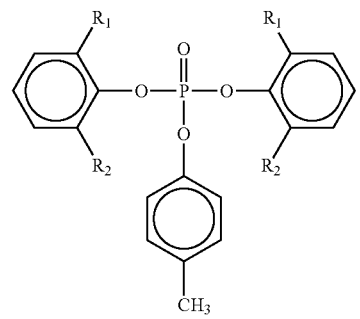

(5)

(where, $R_1$ and $R_2$ indicate alkyl groups and $R_1$ and $R_2$ may be the same or different)

If using a phosphorus-based flame retardant of an aromatic non-halogen type liquid at room temperature such as shown in formula (3), formula (4), or formula (5), adjustment of the viscosity of the epoxy resin composition when used together with an inorganic filler is easy and maintenance of the state of the B-stage becomes easy.

If the amount blended of the component (D) in the epoxy resin composition of the present invention becomes less than 3 parts by weight with respect to 100 parts by weight of the total of the component (A), component (B), component (C), and component (D), the prepreg handling characteristics, heat resistance, and mechanical properties become more advantageous, but the flame retardance sometimes declines. Further, if over 15 parts by weight, the flame retardance becomes more advantageous, but the handling characteristics of the prepreg, in particular the work efficiency, declines due to the stronger stickiness, and the heat resistance or mechanical properties also decline in some cases. Therefore, from the viewpoint of the balance of the prepreg flame retardance, moldability, handling characteristics, heat resistance, and mechanical properties, the organic flame retardant serving as the component (D) is preferably included in an amount of 3 to 15 parts by weight with respect to 100 parts by weight of the total of the component (A), component (B), component (C), and component (D).

Component (E)

The epoxy resin composition of the present invention may also contain a curing agent as the component (E). The type of the curing agent used as the component (E) is not particularly limited and may be a general curing agent for an epoxy resin, but it is preferable to select a curing agent and amount blended of the same by which the epoxy resin composition will cure at not more than 130° C. and giving a cured article having a glass transition temperature (Tg) of at least 100° C.

Note that the glass transition temperature (Tg) of the cured resin is measured by molding an epoxy resin composition containing a curing agent under curing conditions of 130° C. and 3 hours to obtain a cured resin sheet of a thickness of 2 mm, then cutting this to a length of 60 mm and a width of 12 mm to prepare a test piece, using a dynamic viscoelasticity measurement apparatus RDA-700 made by Rheometric Far East to raise the test piece in temperature by 5° C./step and applying a shear force to the test piece at a speed of 10 radian/sec to measure the temperature dependency of the storage rigidity of the test piece, then finding the glass transition temperature by the intersection of the tangent at the glass state region of the curve of temperature dependency of the storage rigidity and the tangent of the transition region.

As the component (E) satisfying the above condition, for example, dicyanodiamide (DICY) may be mentioned. Further, when using this DICY as the curing agent, 3,4-dichlorophenyl-1,1-dimethylurea (DCMU), phenyldimethylurea (PDMU), or another curing accelerator is preferably used together.

If the viscosity at 60° C. of the flame retardant epoxy resin composition of the present invention containing the component (E) is less than 100 poise, the tackiness of the resin composition will be too strong and after once sticking a prepreg on and trying to correct it, it will become impossible to peel it off again or the flow of resin at the time of molding will become large and a cured article of the targeted physical properties will not be able to be obtained in some cases. Further, if over 5000 poise, the viscosity of the resin composition will be too large, so the stickiness of the resin composition on the surface of the prepreg will be lost and prepregs will no longer stick together and will shift in position in a step of stacking the prepregs, so the handling characteristics of the prepregs will become poor or the prepregs will become hard and similarly a cured article of the targeted physical properties will sometimes be unable to be obtained. Therefore, the flame retardant epoxy resin composition containing the curing agent serving as the component (E) preferably has a lower limit of viscosity at the temperature of coating a resin film of at least 100 poise and more preferably at least 200 poise. Further, the upper limit is preferably not more than 5000 poise, more preferably not more than 2000 poise.

Note that the viscosity of the epoxy resin composition is the viscosity measured by filling the prepared epoxy resin composition between two disk plates of diameters of 25 mm of the dynamic viscoelasticity measurement apparatus (disk plate interval 0.5 mm), setting the ambient temperature to a predetermined temperature, and measuring it under the conditions of a shear rate of 10 radian/sec.

Component (F)

The epoxy resin composition of the present invention may further have added to it a thermoplastic resin as the component (F). Up to now, even if the amount of the inorganic filler was increased by the method of adding a small amount of a generally used dispersant etc., when adding the inorganic filler in an amount of at least 40 wt % with respect to the total amount of resin, in many cases it was hard to form a uniformly dispersed resin layer and a uniform resin film could not be formed, but by adding a suitable amount of the thermoplastic resin serving as the component (F) to this flame retardant epoxy resin composition, it is possible to keep the inorganic filler in a uniform dispersed state, the epoxy resin composition become easier to peel off from the release paper, and it is possible to prepare a resin film with a superior releasability. In this case, it is also possible to use together a dispersant for increasing the amount of the inorganic filler.

The thermoplastic resin serving as the component (F) is not particularly limited so long as it dissolves in the epoxy resin, but in particular a polyvinyl formal, a phenoxy resin, or mixture of the two is preferable.

In the epoxy resin composition of the present invention, if the amount blended of the thermoplastic resin serving as the component (F) becomes less than 0.5 part by weight with respect to 100 parts by weight of the total of the component (A), component (B), component (C), component (D), and component (F), when coating this epoxy resin composition on release paper to prepare a resin film, the releasability of the epoxy resin composition from the release paper sometimes becomes poor. Further, if over 10 parts by weight, while the releasability becomes more advantageous, the handling characteristics of the prepreg becomes poorer. In particular, the viscosity of the epoxy resin composition becomes high and therefore the impregnatability into the reinforcing fiber ends up becoming poor in some cases. Therefore, to obtain a balance among the prepreg flame retardance, moldability, handling characteristics, heat resistance, and mechanical properties, the thermoplastic resin serving as the component (F) preferably has a lower limit of at least 0.5, more preferably at least 3, with respect to 100 parts by weight of the total of the component (A), component (B), component (C), component (D), and component (F). Further, the upper limit is preferably not more than 10, more preferably not more than 6. By using this range, it becomes possible to increase the amount of the inorganic filler from the case of no addition of a thermoplastic resin.

When adding the component (F), if the ratio by weight of the component (B)/component (A) of the epoxy resin components in the epoxy resin composition becomes less than 5/100, the heat resistance becomes more advantageous, but the handling characteristics of the prepreg sometimes fall. On the other hand, if the ratio by weight of the component (B)/component (A) exceeds 90/100, the handling characteristics of the prepreg become more advantageous, but the heat resistance sometimes falls. Therefore, when adding the component (F), the ratio by weight of the component (B)/component (A) is preferably 5/100 to 90/100.

When adding the component (F), if the ratio by weight of the component (C) and the component (D) becomes less than 5, the handling characteristics of the prepreg become more advantageous, but the flame retardance becomes insufficient in some cases. Further, if over 20 parts by weight, the flame retardance becomes more advantageous, but the handling characteristics of the prepreg and the heat resistance and mechanical properties of the composite sometimes fall. Therefore, the ratio by weight of the component (C) and the component (D) is preferably 5 to 20.

When adding the component (F), if the total of the component (C) and the component (D) becomes less than 40 parts by weight with respect to 100 parts by weight of total of the component (A), component (B), component (C), component (D), and component (F), the prepreg handling characteristics, heat resistance, and mechanical properties become more advantageous, but the flame retardance becomes insufficient in some cases. Further, if over 70 parts by weight, the flame retardance becomes more advantageous, but the handling characteristics of the prepreg and the heat resistance and the mechanical properties of the composite sometimes fall. Therefore, from the viewpoint of the balance among the flame retardance, moldability, and handling characteristics of the prepreg and the heat resistance and mechanical properties of the composite, it is preferable to make the total weight of the component (C) and component (D) 40 to 70 parts by weight with respect to 100 parts by weight of the total of the component (A), component (B), component (D), component (D), and component (F).

When adding the component (F), if the viscosity at 65° C. of the flame retardant epoxy resin composition containing the curing agent serving as the component (E) is less than 100 poise, the tack of the resin composition becomes too strong and the resin composition will no longer be able to be peeled from the release paper or a cured article of the targeted weight will no longer be able to be obtained. If over 8000 poise, the viscosity of the resin composition will be too high, so the impregnatability of the resin at the time of making prepregs will become poor and a cured article of the targeted physical properties will become harder to obtain. The flame retardant epoxy resin composition containing the curing agent serving as the component (E) preferably has a lower limit of viscosity at the coating temperature at the time of formation of a resin film of at least 100 poise, more preferably at least 500 poise. Further, the upper limit is preferably not more than 8000 poise, more preferably not more than 7000 poise.

The prepreg of the present invention is comprised of the flame retardant epoxy resin composition containing the curing agent serving as the component (E) impregnated in reinforcing fiber. The form and arrangement of the reinforcing fiber used when obtaining this prepreg are not particularly limited. For example, it is possible to use fiber in the form of filaments aligned in one direction, cloth, tow, matt, knit, sleeve, etc.

Further, the reinforcing fiber is not particularly limited in material etc. For example, carbon fiber, glass fiber, aramid fiber, boron fiber, steel fiber, etc. may be used. In particular, since the mechanical properties after molding are good, reinforcing fiber comprised of carbon fiber is preferable. As the carbon fiber, either a polyacrylonitrile (PAN) based carbon fiber or pitch based carbon fiber may be used.

The prepreg of the present invention is used as for example a prepreg for lamination. By curing and molding this, it can be formed into various fiber-reinforced composites. The prepreg can be cured and molded for example by compression molding using a mold etc., autoclave molding, vacuum bag molding, tape wrapping molding, etc.

Note that the flame retardant epoxy resin composition of the present invention containing the curing agent serving as the component (E) is particularly suitable as a resin composition for forming a fiber-reinforced composite, but is not limited to applications for making this fiber-reinforced composite and for example may also be applied to compound applications etc. of course.

Below, the specific configuration of the flame retardant epoxy resin composition of the present invention and the prepreg and fiber-reinforced composite using the same will be explained based on examples while compared with the configurations given in comparative examples.

Note that the abbreviations and test methods of the compounds in the examples are as follows:

Epoxy Resin
1. "Phenolic Novolak Type Epoxy Resin"
Phenolic novolak type epoxy shown in formula (1) or formula (2)
EP1032H60: Special multifunctional epoxy resin made by Japan Epoxy Resin (epoxy equivalent: 170, solid at ordinary temperature)
EPPN-502H: Special multifunctional epoxy resin made by Nippon Kayaku (epoxy equivalent: 175, solid at ordinary temperature)
EP157S65: Special multifunctional type epoxy resin made by Japan Epoxy Resin (epoxy equivalent: 210, solid at ordinary temperature)
2. Phenolic Novolak Type Epoxy Resin Not Containing a Halogen
N770: Phenolic novolak type epoxy resin made by Dainippon Ink and Chemicals (epoxy equivalent: 190, solid at ordinary temperature)
3. Phenolic Novolak Type Epoxy Resin Containing a Halogen
5050: Bromine-containing epoxy resin made by Japan Epoxy Resin (epoxy equivalent: 380, solid at ordinary temperature)
4. "Bisphenol Type Epoxy Resin Not Containing halogen"
EP828: Bisphenol A type epoxy resin made by Japan Epoxy Resin, Epicoat 828 (epoxy equivalent: 184 to 194, liquid at ordinary temperature)
5. "Inorganic Filler"
C-301: Particulate aluminum hydroxide made by Sumitomo Chemical (average particle size: 1.0 μm)
C-31: Ordinary particle aluminum hydroxide made by Sumitomo Chemical (average particle size: 50 μm)
6. "Organic Flame Retardant"
DMP: Dimethylphenyl phosphonate made by Nissan Chemical Industries
CDP: Cresyl diphenyl phosphate made by Daihachi Chemical Industry
PX-110: Cresyl di-2,6-xylenyl phosphate made by Daihachi Chemical Industry
PPA: Phenyl phosphoric acid made by Nissan Chemical Industries
7. "Thermoplastic Resin"
Vinylec E: Polyvinyl formal made by Chisso Corporation
8. "Curing Agent"
DICY: Dicyanodiamide made by Japan Epoxy Resin, Epicure DICY 7 (molecular weight: 84)
9. "Curing Accelerator"
DCMU: Dichlorodimethyl urea made by Hodogaya Chemical, DCMU-99 (molecular weight: 233)
PDMU: Phenyldimethyl urea made by BTR Japan, Omicure 94

Viscosity of Epoxy Resin Composition
The viscosity when filling a prepared epoxy resin composition between two 25 mm diameter disk plates (disk plate interval 0.5 mm), setting the ambient temperature to a predetermined temperature, and measuring the viscosity under conditions of a shear speed of 10 radian/sec using a dynamic viscoelasticity measurement apparatus DSR-200 made by Rheometric.

Glass Transition Temperature (Tg) of Cured Article
Found by molding an epoxy resin composition containing a curing agent under curing conditions of 130° C. and 3 hours to obtain a cured resin sheet of a thickness of 2 mm, then cutting this into sizes of 60 mm length×12 mm width to prepare test samples, using a dynamic viscoelasticity measurement apparatus RDA-700 made by Rheometric Far East to raise the test pieces in temperature at 5° C./step and apply a shear force at a speed of 10 radian/sec, measuring the temperature dependency of the storage rigidity of the test pieces, and finding the intersection between the tangent at the glass state region of the curve of temperature dependency of the storage rigidity and the tangent in the transition region.

Handling Characteristics of Prepregs

The prepregs were tested by an organoleptic test using the fingertips and were evaluated by the following judgment criteria:

G: Good in both tack and flexibility and extremely easily stuck to a metal mold.

F: Lacking in flexibility, so somewhat difficult to stick to a metal mold.

P: Tack extremely poor and difficult to stick to metal mold.

Peelability from Release Paper

The resin films were impregnated with carbon fibers, then resin remaining on the release paper after removing the prepregs from the release paper was evaluated visually.

G (Good): Peelability good

P (Poor): Peelability poor.

Three-Point Bending Test of Fiber-Reinforced Composite

A universal dynamic tester Tensilon made by Orientech Co. was used to conduct the test under the conditions shown in Table 1 given below:

TABLE 1

| Test piece dimensions | | | Probe tip radius | Probe movement speed | L/D |
|---|---|---|---|---|---|
| Length | Width | Thickness | | | |
| Warp direction 120 mm | 10 mm | 2 mm | 3.2 mm | 2 mm/min | 40 |
| ILSS 25 mm | 12 mm | 2 mm | 1.6 mm | 2 mm/min | 4 |

L/D: [length between support points]/[Thickness of test piece].

Burning Test

Based on the UL-94 vertical burning test of FRP, a test piece cut to dimensions of 127 mm×12.7 mm×3 mm in the case of a resin sheet or a test piece cut to dimensions of 127 mm×12.7 mm×2 mm in the case of a fiber-reinforced composite was used, a test flame comprised of a blue flame with no yellow flame made a height of 20±1 mm was prepared, then the test flame was applied to the center of the bottom end of a test piece for 10 seconds, then removed, then the burning time of the test piece was recorded. Immediately after the test piece stopped burning, the above test flame was applied to it for 10 seconds, then removed and the burning time was similarly recorded. The flammability of the resin sheets and the fiber-reinforced composites was judged in accordance with the following Table 2.

TABLE 2

| | 94V-0 | 94V-1 | 94V-2 |
|---|---|---|---|
| Residual burning time after all samples ignited | Within 10 sec | Within 30 sec | Within 30 sec |
| Total of residual burning time for total 10 tests igniting each sample of five sample group twice | Within 50 sec | Within 250 sec | Within 250 sec |
| Residual burning or residual smoldering up to clamps | None | None | None |
| Dripping of flaming pieces igniting cotton 300 mm below | None | None | Yes |

TABLE 2-continued

| | 94V-0 | 94V-1 | 94V-2 |
|---|---|---|---|
| Total of residual burningtime and residual smoldering time after removal of flame second time | Within 30 sec | Within 60 sec | Within 60 sec |

EXAMPLE 1

50 parts by weight of EP1032H60, 35 parts by weight of N770, 30 parts by weight of C-301, and 10 parts by weight of DMP were taken and kneaded until becoming homogeneous in a kneader raised in temperature to 80° C., then a total of 22 parts by weight of a curing catalyst obtained by mixing in advance 12 parts by weight of EP828, 6 parts by weight of DICY, and 4 parts by weight of DCMU in an agihomogenizer was added and the result kneaded by a kneader until becoming homogeneous to obtain a flame retardant epoxy resin composition.

The obtained epoxy resin composition was coated at 60° C. on release paper to make a resin film, then this resin film was hot pressed at 80° C. onto carbon fiber (TR30S 3L (made by Mitsubishi Rayon, PAN-based carbon fiber, tensile modulus 240 GPa) cloth woven in the 0–90 degree direction so as to impregnate the reinforcing fiber comprised of the carbon fiber with the epoxy resin composition and obtain a prepreg having a carbon fiber basis weight of 200 g/m$^2$ and a resin content of 40 wt %.

Next, prepregs were stacked while aligning the fiber directions of the reinforcing fiber and autoclave molded under curing conditions of 130° C.×3 hours to form a fiber-reinforced composite (FRP) having carbon fiber as reinforcing fiber.

EXAMPLES 2 to 9 AND COMPARATIVE EXAMPLES 1 TO 7

In the same way as in Example 1, the ingredients shown in the predetermined column of the following Table 3 were blended in the ratios shown in the predetermined column of Table 3 so as to prepare flame retardant epoxy resin compositions as examples of the present invention. Prepregs were prepared and molded into fiber-reinforced composites. Further, the components shown in the predetermined column of the following Table 3 were blended in the ratios shown in the predetermined column of Table 3 so as to prepare flame retardant epoxy resin compositions as examples of the present invention. Prepregs were prepared and molded into fiber-reinforced composites. Further, the ingredients shown in the predetermined column of the following Table 4 were blended in the ratios shown in the predetermined column of the same Table 4 to prepare epoxy resin compositions and prepregs and fiber-reinforced composites using the same for comparison.

Along with the ingredients and ratios of composition of the epoxy resin compositions, the rheometer viscosities of the epoxy resin composition, the glass transition temperatures (Tg) of the cured articles, the results of UL94 burning tests of resin sheets (3 mm), the handling characteristics of the prepregs, the peelability from release paper, the three-point bending strength of the FRP shaped articles, the interlayer shear strength (ILSS), and the results of UL94 burning tests of FRP shaped articles are shown together in Table 3 and Table 4. Note that in Table 3 and Table 4, the ratios of composition of the ingredients are parts by weight and the ingredients are indicated by abbreviations.

TABLE 3

|  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| EP1032H60 | 50 |  | 40 | 60 | 25 | 50 | 50 | 50 | 50 |
| EP157S65 |  | 50 |  |  | 25 |  | 10 |  |  |
| N770 | 35 | 35 | 35 | 30 | 35 | 35 |  | 35 | 35 |
| 5050 |  |  |  |  |  |  |  |  |  |
| EP828 | 12 | 12 | 12 | 12 | 12 | 12 | 53 | 12 | 12 |
| C-301 | 30 | 30 | 35 | 30 | 30 |  | 150 | 30 | 30 |
| C-31 |  |  |  |  |  | 30 |  |  |  |
| DMP | 10 | 10 | 5 | 15 | 10 | 10 | 15 |  |  |
| CDP |  |  |  |  |  |  |  | 10 |  |
| PX-110 |  |  |  |  |  |  |  |  | 10 |
| DICY | 6 | 6 | 6 | 6 | 6 | 6 | 8 | 6 | 6 |
| DCMU | 4 | 4 | 4 | 4 | 4 | 4 |  | 4 | 4 |
| PDMU |  |  |  |  |  |  | 6 |  |  |
| Byk-995 |  |  |  |  |  |  | 2 |  |  |
| Viscosity of resin composition (poise, 65° C.) | 300 | 500 | 800 | 355 | 400 | 400 | 500 | 1700 | 3000 |
| Glass transition temperature (° C.) of cured resin | 134 | 125 | 128 | 130 | 130 | 130 | 125 | 138 | 137 |
| Results of UL-94 vertical burning test of resin sheet (3 mm) | V-1 | V-1 | V-1 | V-1 | V-1 | V-1 | V-0 | V-1 | V-1 |
| Handling characteristics of prepreg | G | G | G | G | G | G | P | G | G |
| Peelability from release paper | G | G | G | G | G | G | P | G | G |
| Three-point bending strength of FRP shaped article: warp direction (Mpa) | 1019 | 1000 | 1009 | 1039 | 1029 | 882 | 1000 | 1200 | 1215 |
| ILSS (Mpa) | 81 | 79 | 80 | 81 | 80 | 75 | 52 | 81 | 72 |
| Results of UL-94 vertical burning test of FRP (2 mm) | V-0 | V-0 | V-0 | V-0 | V-0 | V-0 | V-0 | V-0 | V-0 |

TABLE 4

|  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| EP1032H60 |  |  |  | 35 |  |  | 35 |
| N669 | 35 | 40 | 50 |  | 50 | 35 | 50 |
| 5959 | 50 | 50 |  | 30 |  | 50 |  |
| EP828 | 12 | 12 | 30 | 12 | 53 | 53 | 12 |
| C-301 |  |  |  | 50 | 60 | 150 | 50 |
| DMP | 10 |  |  | 40 | 8 | 15 |  |
| PPA |  |  |  |  |  |  | 10 |
| DICY | 6 | 6 | 6 | 6 | 8 | 8 | 6 |
| DCMU | 4 | 4 | 4 | 4 | 6 | 6 | 4 |
| Vinylec E |  |  |  |  | 2 |  |  |
| Byk-995 |  |  |  |  |  | 2 |  |
| Viscosity of resin composition (poise, 65° C.) | 1000 | 1200 | 800 | 70 | 800 | 400 | 20000 |
| Glass transition temperature (° C.) of cured resin | 95 | 100 | 125 | 97 | 90 | 95 | 95 |
| Results of UL-94 vertical burning test of resin plate (3 mm) | V-1 | V-1 | V-1 | V-1 | V-0 | V-0 | V-1 |
| Handling characteristics of prepreg | G | G | G | P | G | P | P |
| Peelability from release paper | G | G | G | P | G | P | P |
| Three-point bending strength of FRP shaped article: warp direction (Mpa) | 1078 | 1009 | 1127 | 980 | 700 | 800 | Not moldable |
| ILSS (Mpa) | 80 | 81 | 78 | 78 | 50 | 51 | Not moldable |

TABLE 4-continued

|  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Results of UL-94 vertical burning test of FRP (2 mm) | V-0 | V-0 | Burns | V-0 | V-0 | V-0 | Not moldable |

Here, Comparative Example 1 is a comparative example where the requirements of the component (A) and component (C) are not satisfied. Comparative Examples 2 and 3 are comparative examples where the requirements of the component (A), component (C), and component (D) are not satisfied. Comparative Example 4 is a comparative example where the requirements of the component (A) and component (D) are not satisfied. Comparative Examples 5 and 6 are comparative examples where the requirement of the component (A) is not satisfied. Comparative Example 7 is a comparative example where the requirement of component (D) is not satisfied.

Comparing Examples 1 to 9 and Comparative Examples 1 and 2, by including in the phenolic novolak type epoxy resin serving as the component (A) the phenolic novolak type epoxy resin of the above formula (1) or (2), it is learned that an improvement of the glass transition temperature of the cured article of the epoxy resin composition and an improvement of the mechanical properties when making this into a fiber-reinforced composite are attained.

Further, the results of the UL-94 vertical burning tests of the fiber-reinforced composites of the epoxy resin compositions of Examples 1 to 9 were all V-0—meaning superior flame retardance—regardless of being non-halogen systems.

The epoxy resin composition of Example 6 featured an average particle size of the inorganic filler blended in larger than the diameter of the reinforcing fiber and selective filtration of the inorganic filler when made into a prepreg—resulting in uneven content of the inorganic filler at the surface and inside of the prepreg. Therefore, the prepreg lost stickiness due to the presence of the inorganic filler remaining on the surface of the prepreg.

Comparing Examples 1 to 9 and Comparative Example 3, the epoxy resin composition of Comparative Example 3 did not contain either the inorganic filler or the organic flame retardant, so the fiber-reinforced composite made from this was more advantageous in mechanical properties or heat resistance, but ended up burning due to the burning test.

Comparing Examples 1 to 9 and Comparative Example 4, the epoxy resin composition of Comparative Example 4 had a large amount of organic phosphorus-based compound serving as the organic flame retardant blended into it and had a lower viscosity as the epoxy resin composition, so the handling characteristics of the prepreg made of the epoxy resin composition were poor and the mechanical properties of the fiber-reinforced composite were also not good.

The epoxy resin composition of Comparative Examples 5 and 6 did not contain the phenolic novolak type epoxy resin of the above formula (1) or (2) in the phenolic novolak type epoxy resin serving as the component (A), so had low glass transition temperatures as epoxy resin composition and gave lower mechanical properties when made into fiber-reinforced composites.

The epoxy resin composition of Comparative Example 7 contained phenyl phosphonic acid able to react with the epoxy groups as the component (D), so ended up increasing in viscosity during preparation of the resin. It was unable to be adjusted to a suitable viscosity enabling formation of a resin film, so no prepreg could be formed.

EXAMPLES 10 to 16

Examples 10 to 16 are shown as more preferable examples.

In the same way as Example 1, epoxy resin compositions of Examples 10 to 16 shown in Table 5 were prepared and coated on release paper at 65° C. to make resin films, then the resin films were hot pressed onto carbon fiber (TR30S 3L (made by Mitsubishi Rayon, PAN based carbon fiber, tensile modulus 240 GPa) cloth woven in the 0–90 degree direction so as to impregnate the epoxy resin compositions in the reinforcing fibers comprised of carbon fibers and obtain prepregs as examples of the present invention having carbon fiber basis weights of 200 g/m$^2$ and resin contents of 40 wt %.

Next, in the same way as in Example 1, fiber-reinforced composites (FRP) using carbon fiber as reinforcing fiber were formed.

Along with the ingredients and ratios of composition of the epoxy resin composition, the rheometer viscosities of the epoxy resin compositions, the glass transition temperatures (Tg) of the cured articles, the handling characteristics of the prepregs, the peelability from release paper, the three-point bending strength of the FRP shaped articles, and the interlayer shear strength (ILSS), and the results of UL94 burning tests of epoxy resin sheets and FRP shaped articles are shown together in Table 5. Note that in Table 5, the ratios of composition of the ingredients are parts by weight and the ingredients are indicated by abbreviations.

TABLE 5

|  | Ex. 10 | Ex. 11 | Ex. 12 | Ex. 13 | Ex. 14 | Ex. 15 | Ex. 16 |
|---|---|---|---|---|---|---|---|
| EP1032H60 | 50 | 50 |  | 50 |  | 50 | 50 |
| EPPN-502H |  |  | 50 |  | 50 |  |  |
| N770 |  |  | 10 | 20 | 10 | 10 |  |
| EP828 | 23 | 32 | 20 | 53 | 128 | 23 | 23 |
| C-301 | 60 | 150 | 72 | 150 | 220 | 60 | 60 |
| DMP | 10 | 10 | 13 | 15 | 15 |  |  |
| CDP |  |  |  |  |  | 10 |  |

TABLE 5-continued

|  | Ex. 10 | Ex. 11 | Ex. 12 | Ex. 13 | Ex. 14 | Ex. 15 | Ex. 16 |
|---|---|---|---|---|---|---|---|
| PX-110 |  |  |  |  |  |  | 10 |
| DICY | 8 | 8 | 8 | 8 | 8 | 8 | 8 |
| PDMU | 6 | 6 | 6 | 6 | 6 | 6 | 6 |
| Vinylec E | 2 | 3 | 2 | 15 | 23 | 2 | 2 |
| Byk-995 |  | 3 |  | 2 | 2 |  |  |
| Viscosity of resin composition (poise, 65° C.) | 260 | 265 | 366 | 6900 | 5600 | 1500 | 3000 |
| Glass transition temperature (° C.) of cured resin | 127 | 131 | 127 | 130 | 125 | 125 | 130 |
| Results of UL-94 vertical burning test of resin sheet (3 mm) | V-0 | V-0 | V-0 | V-0 | V-0 | V-0 | V-0 |
| Handling characteristics of prepreg | G | G | G | G | G | G | G |
| Peelability from release paper | G | G | G | G | G | G | G |
| Three-point bending strength of FRP shaped article: warp direction (Mpa) | 1140 | 800 | 1150 | 1050 | 1100 | 1100 | 1150 |
| ILSS (Mpa) | 57 | 50 | 62 | 58 | 65 | 58 | 60 |
| Results of UL-94 vertical burning test of FRP (2 mm) | V-0 | V-0 | V-0 | V-0 | V-0 | V-0 | V-0 |

From Example 10 to Example 16, it was learned that by blending in a thermoplastic resin, it is possible to increase the amount of the flame retardant compared with the case of Examples 1 to 9. UL-94 vertical burning tests of the epoxy resin compositions alone (thickness 3 mm) and the fiber-reinforced composites (thickness 2 mm) using these epoxy resin compositions gave results of V-0 in all cases despite being non-halogen systems—meaning superior flame retardance and improved flame retardance of the resins alone as well.

The resin composition of Comparative Example 6 included 47 wt % of inorganic filler with respect to the total weight of the resin and did not contain any predetermined thermoplastic resin, so it was difficult to form a resin layer with inorganic filler uniformly dispersed in it and not possible to coat a resin film of a uniform thickness. When peeling off the prepreg prepared using this film from the release paper, residual resin on the release paper was observed and it was difficult to obtain a fiber-reinforced composite material having a predetermined uniform Vf (volume content of fiber). In Examples 10 to 16, by blending in predetermined amounts of a thermoplastic resin, it was possible to disperse the inorganic filler uniformly with a high filling rate, so it was possible to greatly improve the releasability of the prepregs from release paper and possible to obtain fiber-reinforced composites having uniform Vf.

INDUSTRIAL APPLICABILITY

The flame retardant epoxy resin composition of the present invention has at least 50 wt % of the phenolic novolak type epoxy resin in the epoxy resin components comprised of a phenolic novolak type epoxy resin of the above formula (1) or (2), is superior in flame retardance while being a non-halogen system, and does not positively use a reaction between a flame retardant provided with functional groups able to react with an epoxy resin and an epoxy resin, so has not factors inconvenient for mass production and is provided with superior flame retardance.

Further, when increasing the amount of the inorganic filler, with the method of adding a small amount of a conventionally generally used dispersant etc., it was hard to form a uniformly dispersed resin layer, a uniform resin film could not be formed, and the releasability from release paper was not good, but if adding to the flame retardant epoxy resin of the present invention a thermoplastic resin, it is possible to keep the inorganic filler in a uniform dispersed state, the epoxy resin composition becomes easier to peel off from the release paper, and it is possible to prepare a resin film with a superior releasability.

Further, the flame retardant epoxy resin composition of the present invention has good impregnatability when impregnating reinforcing fiber to form a prepreg. Further, the fiber-reinforced composite obtained by curing and molding this prepreg was suppressed in decline of mechanical properties and heat resistance and good in the balance between the two despite the epoxy resin composition containing an inorganic filler or organic flame retardant and was provided with a superior flame retardance. Further, by blending into the flame retardant epoxy resin composition a thermoplastic resin in a specific ratio, it is possible to increase the amount of the flame retardant and obtain more superior flame retardance and superior handling characteristics when making a prepreg.

The invention claimed is:
1. A flame retardant epoxy resin composition containing the following components (A), (B), (C), and (D):
   (A) a phenolic novolak type epoxy resin including a phenolic novolak type epoxy resin of the following formula (1) and/or formula (2) in a total of at least 50 wt %:

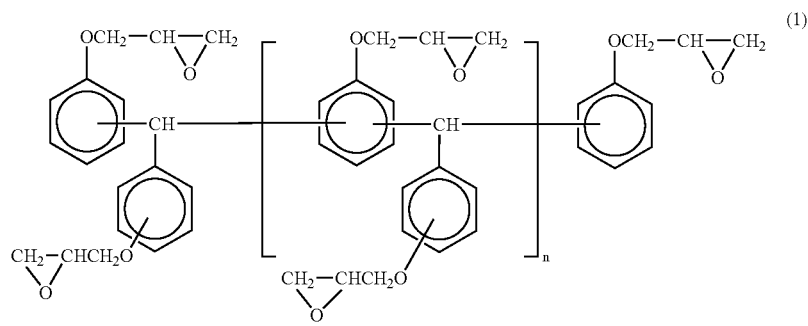

(wherein, n is 0 or a positive integer)

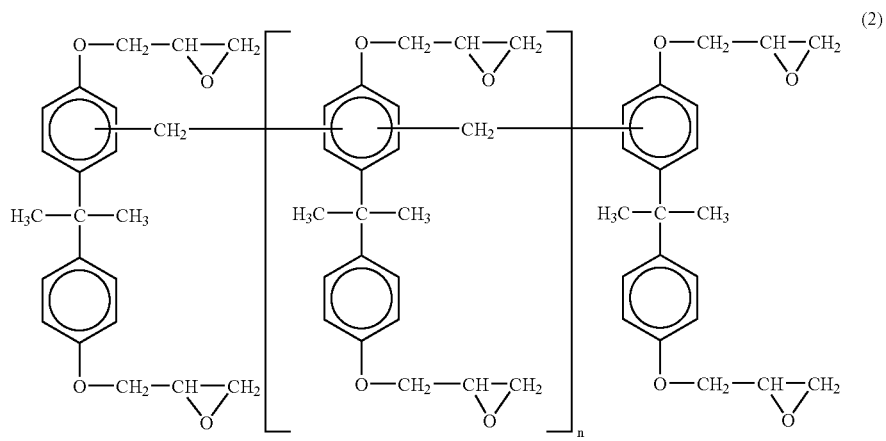

(wherein, n is 0 or a positive integer)

(B) a bisphenol type epoxy resin not containing a halogen,
(C) an inorganic filler, and
(D) an organic flame retardant, wherein the viscosity at 60° C. is 100 to 5000 poise.

2. A flame retardant epoxy resin composition as set forth in claim 1, wherein when the ratio by weight of composition of the component (A) and the component (B) is 100:5 to 100:20 and the total of the component (A), the component (B), the component (C), and the component (D) is 100 parts by weight, the component (C) is 5 to 30 parts by weight and the component (D) is 3 to 15 parts by weight.

3. A flame retardant epoxy resin composition comprised of an epoxy resin composition set forth in claim 1 into which a curing agent is further blended as a component (E).

4. A prepreg containing reinforcing fiber and a flame retardant epoxy resin composition as set forth in claim 3 impregnated in the reinforcing fiber.

5. A fiber-reinforced composite obtained by molding a molding material containing a prepreg as set forth in claim 4.

6. A flame retardant epoxy resin composition containing the following components (A), (B), (C), (D), (E) and (F):

(A) a phenolic novolak type epoxy resin including a phenolic novolak type epoxy resin of the following formula (1) and/or formula (2) in a total of at least 50 wt %:

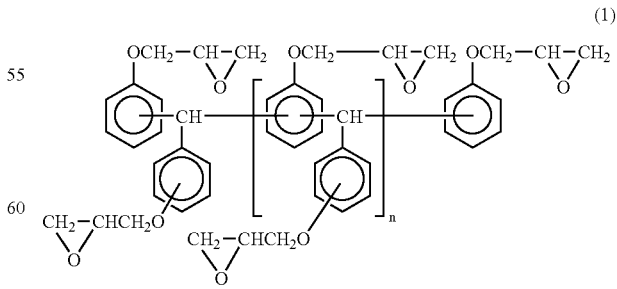

(wherein, n is 0 or a positive integer)

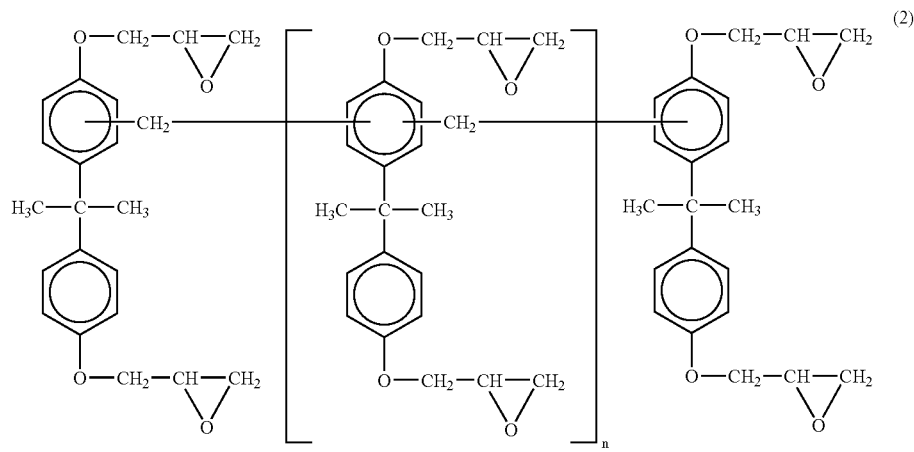

(wherein, n is 0 or a positive integer)

(B) a bisphenol type epoxy resin not containing a halogen, (C) an inorganic filler, (D) an organic flame retardant selected from the group consisting of compounds of the following formulae (3), (4) and (5), and mixtures thereof:

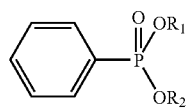

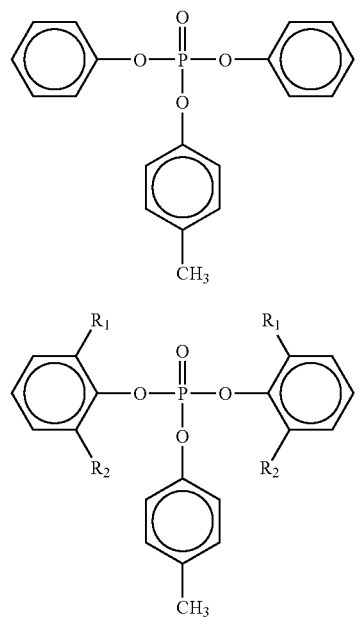

(where, $R_1$ and $R_2$ are alkyl groups and $R_1$ and $R_2$ may be the same or different), (E) a curing agent, and (F) a thermoplastic resin, wherein a viscosity at 65° C. is 100 to 8000 poise.

7. A flame retardant epoxy resin composition containing the following components (A), (B), (C), (D) and (F):

(A) a phenolic novolak type epoxy resin including a phenolic novolak type epoxy resin of the following formula (1) and/or formula (2) in a total of at least 50 wt %:

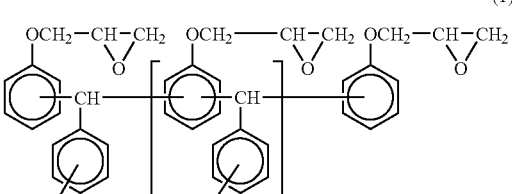

(wherein, n is 0 or a positive integer)

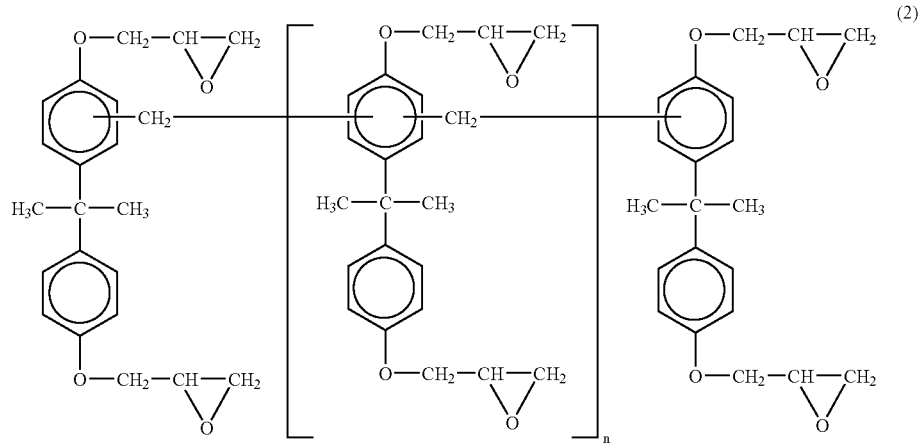

(wherein, n is 0 or a positive integer)
(B) a bisphenol type epoxy resin not containing a halogen,
(C) an inorganic filler,
(D) an organic flame retardant selected from the group consisting of compounds of the following formulae (3), (4) and (5), and mixtures thereof:

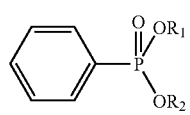

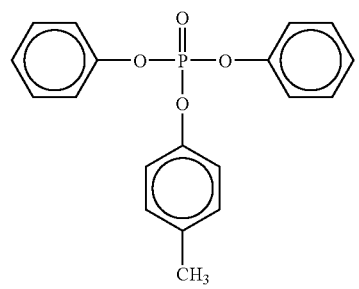

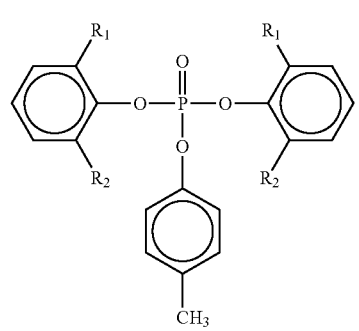

(where, $R_1$ and $R_2$ are alkyl groups and $R_1$ and $R_2$ may be the same or different), and
(F) a thermoplastic resin,
wherein the thermoplastic resin used as the component (F) is one of a polyvinyl formal, phenoxy resin, or a mixture of the two.

8. A flame retardant epoxy resin composition as set forth in claim 7, wherein the ratio by weight of composition of the component (B)/component (A) is 5/100 to 90/100, the ratio by weight of the component (C)/component (D) is 5 to 20, the total of the component (C) and component (D) when making the total of the component (A), component (B), component (C), component (D), and component (F) 100 parts by weight is 40 to 70 parts by weight, and the component (F) is 0.5 to 10 parts by weight.

9. A prepreg containing reinforcing fiber and a flame retardant epoxy resin composition set forth in claim 6 impregnated in the reinforcing fiber.

10. A fiber-reinforced composite obtained by molding a molding material including a prepreg set forth in claim 9.

11. A flame retardant epoxy resin composition containing the following components (A), (B), (C), and (D):
(A) a phenolic novolak type epoxy resin including a phenolic novolak type epoxy resin of the following formula (1) and/or formula (2) in a total of at least 50 wt %:

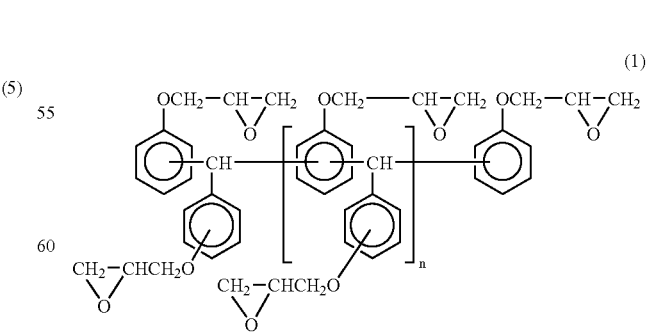

(wherein, n is 0 or a positive integer)

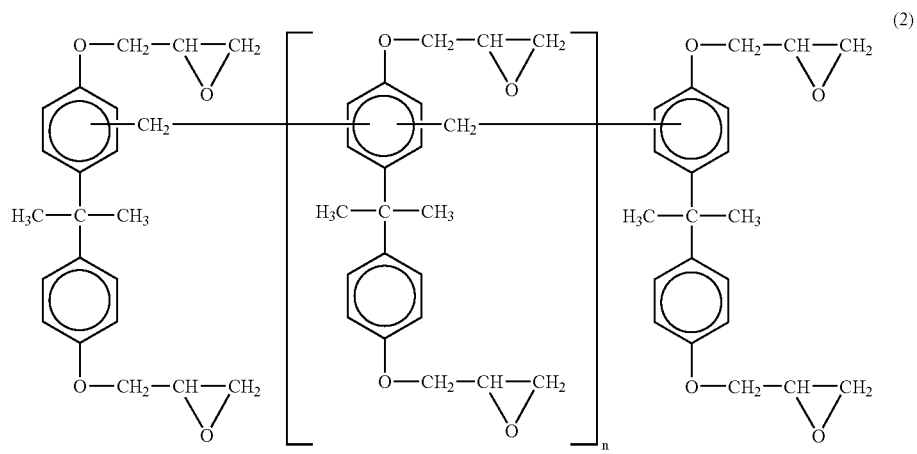

(wherein, n is 0 or a positive integer)
(B) a bisphenol type epoxy resin not containing a halogen,
(C) an inorganic filler, and
(D) an organic flame retardant of the following formula (3):

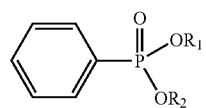

(where, $R_1$ and $R_2$ are alkyl groups and $R_1$ and $R_2$ may be the same or different).

12. A prepreg containing reinforcing fiber and a flame retardant epoxy resin composition as set forth in claim 1 impregnated in the reinforcing fiber.

13. A fiber-reinforced composite obtained by molding a molding material containing a prepreg as set forth in claim 12.

14. A prepreg containing reinforcing fiber and a flame retardant epoxy resin composition as set forth in claim 7 impregnated in the reinforcing fiber.

15. A fiber-reinforced composite obtained by molding a molding material containing a prepreg as set forth in claim 14.

* * * * *